(12) United States Patent
Adkisson et al.

(10) Patent No.: US 7,558,999 B2
(45) Date of Patent: Jul. 7, 2009

(54) LEARNING BASED LOGIC DIAGNOSIS

(75) Inventors: James W. Adkisson, Jericho, VT (US); John M. Cohn, Richmond, VT (US); Leendert M. Huisman, South Burlington, VT (US); Maroun Kassab, St-Eustache (CA); Leah M. Pfeifer Pastel, Essex, VT (US); David E. Sweenor, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 10/709,672

(22) Filed: May 21, 2004

(65) Prior Publication Data
US 2005/0273656 A1 Dec. 8, 2005

(51) Int. Cl.
*G01R 31/28* (2006.01)
*G06F 11/00* (2006.01)
*G11C 29/00* (2006.01)

(52) U.S. Cl. .................. 714/737; 714/718; 714/724; 714/741; 365/201

(58) Field of Classification Search .......... 714/100–825
See application file for complete search history.

(56) References Cited

U.S. PATENT DOCUMENTS

| | | | | |
|---|---|---|---|---|
| 3,780,277 A * | 12/1973 | Armstrong et al. | ............ | 714/33 |
| 4,769,817 A * | 9/1988 | Krohn et al. | .................. | 714/33 |
| 5,200,959 A * | 4/1993 | Gross et al. | ................ | 714/723 |
| H001221 H * | 8/1993 | Best et al. | ............... | 360/97.01 |
| 5,663,967 A * | 9/1997 | Lindberg et al. | ............ | 714/737 |
| 5,729,452 A * | 3/1998 | Smith et al. | ................... | 701/29 |
| 6,308,293 B1 * | 10/2001 | Shimono | .................... | 714/741 |
| 6,408,219 B2 * | 6/2002 | Lamey et al. | ............... | 700/110 |
| 6,516,433 B1 * | 2/2003 | Koenig | ....................... | 714/737 |
| 6,539,503 B1 * | 3/2003 | Walker | ....................... | 714/703 |
| 6,618,682 B2 | 9/2003 | Bulaga et al. | | |
| 6,721,914 B2 * | 4/2004 | Bartenstein et al. | ......... | 714/734 |
| 6,757,621 B2 * | 6/2004 | Mizuno et al. | ................ | 702/35 |
| 7,000,152 B1 * | 2/2006 | Lin | ............................. | 714/42 |
| 7,062,425 B1 * | 6/2006 | Bell et al. | ..................... | 703/14 |
| 7,162,660 B2 * | 1/2007 | Ogino | ........................... | 714/8 |
| 7,216,270 B1 * | 5/2007 | Jacobson et al. | ............ | 714/718 |
| 2002/0145112 A1 | 10/2002 | Davidson | | |
| 2002/0147952 A1 * | 10/2002 | Bartenstein et al. | ......... | 714/734 |
| 2003/0149916 A1 * | 8/2003 | Ohtake et al. | ................. | 714/33 |
| 2003/0163791 A1 | 8/2003 | Falbo et al. | | |
| 2003/0177428 A1 * | 9/2003 | Wakabayashi et al. | ...... | 714/741 |
| 2004/0042293 A1 * | 3/2004 | Ogino | ........................ | 365/202 |

(Continued)

FOREIGN PATENT DOCUMENTS

DE 10036118 2/2002

(Continued)

*Primary Examiner*—Cynthia Britt
*Assistant Examiner*—Guerrier Merant
(74) *Attorney, Agent, or Firm*—Hoffman Warnick LLC; Richard M. Kotulak

(57) ABSTRACT

A system and method for diagnosing a failure in an electronic device. A disclosed system comprises: a defect table that associates previously studied features with known failures; and a fault isolation system that compares an inputted set of suspected faulty device features with the previously studied features listed in the defect table in order to identify causes of the failure.

17 Claims, 2 Drawing Sheets

U.S. PATENT DOCUMENTS

| | | | |
|---|---|---|---|
| 2004/0210803 A1* | 10/2004 | Cheng et al. | 714/710 |
| 2005/0219518 A1* | 10/2005 | Korngut et al. | 356/237.2 |
| 2006/0111873 A1* | 5/2006 | Huang et al. | 702/185 |
| 2007/0283202 A1* | 12/2007 | Cheng et al. | 714/724 |

FOREIGN PATENT DOCUMENTS

| | | |
|---|---|---|
| JP | 3171754 | 7/1991 |
| JP | 2000155156 | 6/2000 |
| JP | 2000181536 | 6/2000 |
| JP | 2001176295 | 6/2001 |

* cited by examiner

LEARNING BASED LOGIC DIAGNOSIS

BACKGROUND OF INVENTION

1. Technical Field

The present invention relates generally to identifying defects in a semiconductor device, and more specifically relates to a logic diagnosis system and method that utilizes a table of manufacturing characterization data to isolate and identify design features known to be error prone.

2. Related Art

Given the complexities involved in manufacturing a semiconductor device, it is not uncommon for a device to have numerous operational faults in the early production stages. Identifying and analyzing these faults remains an important and costly challenge.

Traditional logic diagnosis relies on fault simulation software, which determines a set of logic nets (i.e., circuits) that are suspected to be at fault. Fault simulation software examines the logic of the faulty device, as well as logs of input and output values obtained from operating the actual device, and generates a list of suspect nets that might be causing the defect. From the suspect set of nets, a costly physical analysis is then implemented to attempt to link the defect to a particular physical location and/or manufacturing step. Unfortunately, the suspected set of nets often span across a large portion and various levels of the physical chip layout, thereby driving up the costs of the necessary physical analysis.

Accordingly, a need exists for a system that better diagnoses a failure by, e.g., narrowing down the set of suspected nets identified by today's fault simulation programs.

SUMMARY OF INVENTION

The present invention addresses the above-mentioned problems, as well as others, by providing a table that associates previously studied features, such as nets in an integrated circuit design, with known failures. In a first aspect, the invention provides a diagnosis system for diagnosing a failure in an electronic device, comprising: a defect table that associates previously studied features with known failures; and a fault isolation system that compares an inputted set of suspected faulty device features with the previously studied features listed in the defect table in order to identify causes of the failure.

In a second aspect, the invention provides a method for diagnosing a failure in an electronic device, comprising: simulating the operation of the device; determining a set of features in the device from the simulation that are potentially causing the failure; providing a defect table that associates previously studied features listed in known failures; and comparing the set of features with the previously studied features listed in the defect table in order to identify a cause of the failure.

In a third aspect, the invention provides a program product stored on a recordable medium for diagnosing a failure in an electronic device, comprising: means for storing data that associates previously studied features with known failures; and means for comparing an inputted set of suspected faulty device features with the previously studied features listed in order to identify causes of the failure.

In a fourth aspect, the invention provides a method for fault diagnosis of a failing device, comprising: determining data for suspected locations and features of a fault; entering the data in a table; performing a fault diagnosis; and iterating through the above steps for further failing devices having further faults.

BRIEF DESCRIPTION OF DRAWINGS

These and other features of this invention will be more readily understood from the following detailed description of the various aspects of the invention taken in conjunction with the accompanying drawings in which.

DETAILED DESCRIPTION

Figure 1:
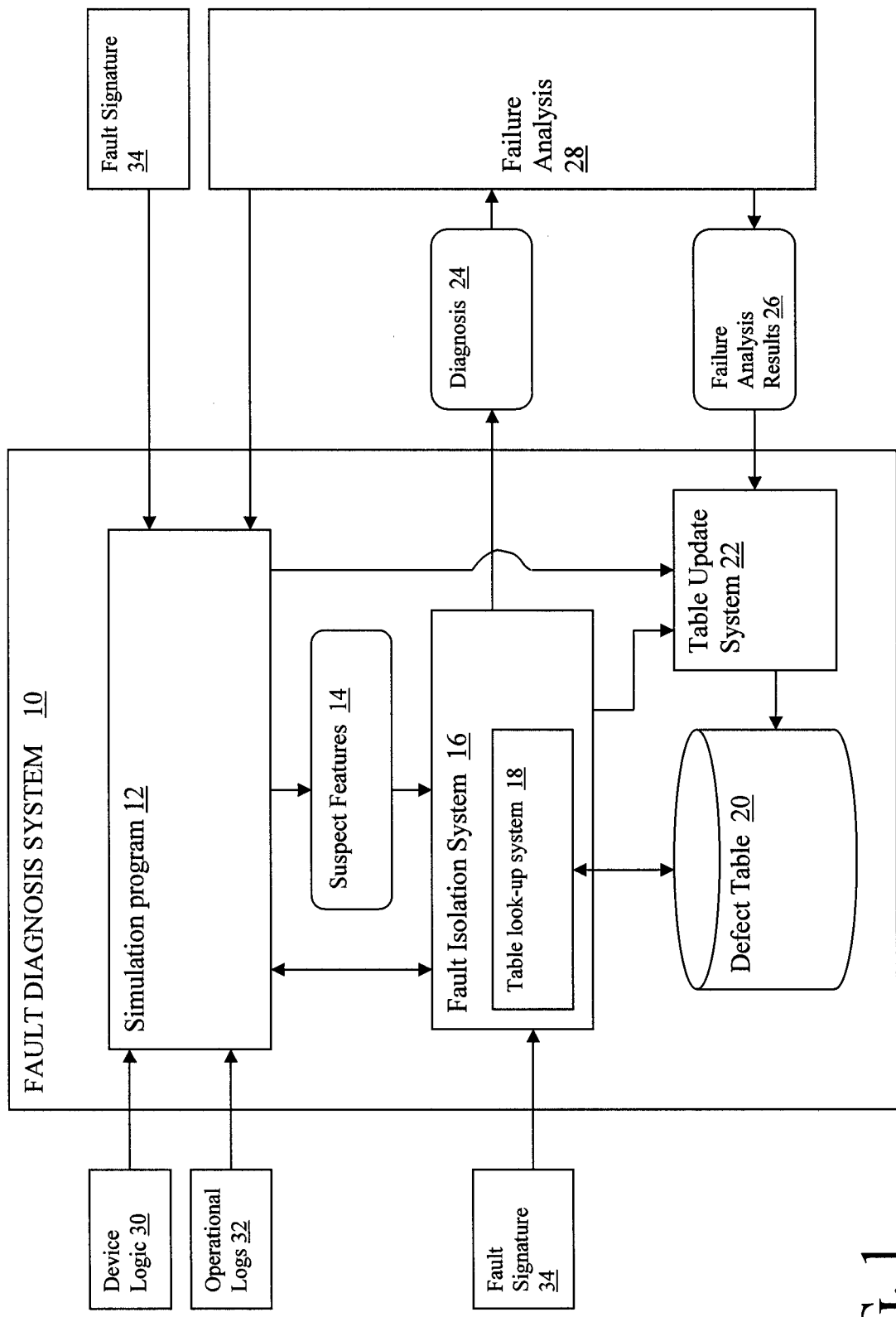
FIG. 1 depicts a learning based logic diagnosis system in accordance with the present invention.

Referring now to the drawings, FIG. 1 depicts a fault diagnosis system 10 that facilitates the diagnosis of faults in an electronic device, such as an integrated circuit. Fault diagnosis system 10 utilizes an adaptive defect table 20, which includes a list of features that are associated with known failures, to facilitate the diagnosis process. The defect table 20 is utilized to help narrow down or identify one or more features that are likely to be causing a failure in a device currently being studied. For instance, defect table 20 may indicate that a particular net design is known to cause a short circuit. If the current device being analyzed includes the particular net and is exhibiting a failure that could be the result of a short circuit by that net, then the net design could be focused on as a highly likely cause of the failure.

As depicted, fault diagnosis system 10 comprises a simulation program 12 that generates a set of suspect features 14, which may cause a failure. The set of suspect features 14 are determined, e.g., by examining: (1) device logic 30, and (2) operational logs 32 comprising actual operational data of a device displaying a particular faulty behavior. Use of such simulation programs are known in the art, and are therefore not described in detail herein. In a typical application, the suspect features 14 generated by simulation program 12 may comprise a list of circuit features (e.g., nets, instances, cells, etc.). Thus, it should be understood that the set of suspect features 14 are not limited to net names, and may comprise, e.g., any type of physical or logical feature of the device being studied, as well as the absence or presence of a feature among a set of features. Moreover, it should be understood that the set of suspect features 14 can be obtained from sources other than a simulation program 12, e.g., from tester based diagnosis, etc. As noted above, the set of suspect features 14 are often spread out all over the device, resulting in significant costs in further performing detailed failure analysis 28.

To address this problem, fault diagnosis system 10 includes fault isolation system 16 that interfaces with defect table 20. In particular, a table look-up system 18 is provided that examines the defect table 20 to see if any of the suspect features 14 are known to cause the particular failure currently being diagnosed. If one or more matches are found, fault isolation system 16 may implement any algorithm or process that utilizes the information in the defect table 20 to generate a diagnosis 24, i.e., one ore more features that are the most likely causes of the failure. The diagnosis 24 may comprise any output that either identifies the fault or helps to narrow the possible set of nets or features causing the fault. For instance, the diagnosis 24 generated by fault isolation system 16 could comprise a single feature, a reduced list of suspect features 24, or some intermediate results that require further simulation or testing.

Defect table 20 may be formed and maintained for one or more products or product types, and include any physical or logical features that are known to cause failures. For instance, consider an exemplary defect table 20 that links net names to failures, which may appear as follows:

[DEFECT TABLE]

| NET NAME | FAILURE (S) |
|---|---|
| Net 1 | Short Circuit, Timing Error |
| Net 2 | Charging Problem |
| Net 3 | Timing Error |
| Net 4 | Short Circuit |
| Etc. | |

In this example, if the simulation program 12 outputted a list of suspect net names that included Net 2 and Net 4, table look-up system 18 would plug those net names into the defect table 20 and check to see if they are known to cause any failures. In this case, the suspect net names are associated with the failures, "charging problem" and "short circuit," respectively. If either of those failures matched the fault signature 34 being displayed by the device, then the associated net name would be included in the diagnosis 24 as a likely cause of the present failure.

It should be recognized that the contents of the defect table 20 could vary depending upon the particular implementation. For instance, table 20 could list: logical and/or physical features (e.g., adjacent vias that result in a particular fault), how the fault is likely to be seen in a test, what levels the fault can occur on, fault likelihood as a function of amount of physical or logical features, positional dependence (i.e., position of a feature on the chip or area of the wafer), performance features, device operation features, the presence or absence of features, etc. In certain cases, identified defects, such as opens or shorts, can be confirmed with further testing or simulation by simulation program 12 by analyzing the features in view of a fault signature 34. After a diagnosis 24 is generated, any type of failure analysis 28, such as physical analysis, can be implemented to further study the problem.

In order to ensure that the information in defect table 20 is up-to-date, fault diagnosis system 10 further comprises a table update system 22, which updates and maintains defect table 20. Sources of data for defect table 20 may include, e.g., failure analysis results 26, results from fault isolation system 16, results from simulation program 12, industry information, etc. Alternatively, sources not involving failure analysis could be used to create and update the table. Examples include: using a tool that identifies particular structures in a design using, for example, pattern recognition to identify locations of a specific structure, e.g., two channel length wires on a level; mapping the specific structures to nets, e.g., each two channel wire on level A to nets x, y, and z; inserting faults on these nets and simulating failure signatures; creating a table with features, nets, failure signatures, etc. It should also be understood that defect table 20 could be implemented in any manner, e.g., as a database, a data object, a text file, in RAM, in ROM, distributed over a network, etc.

Figure 2:
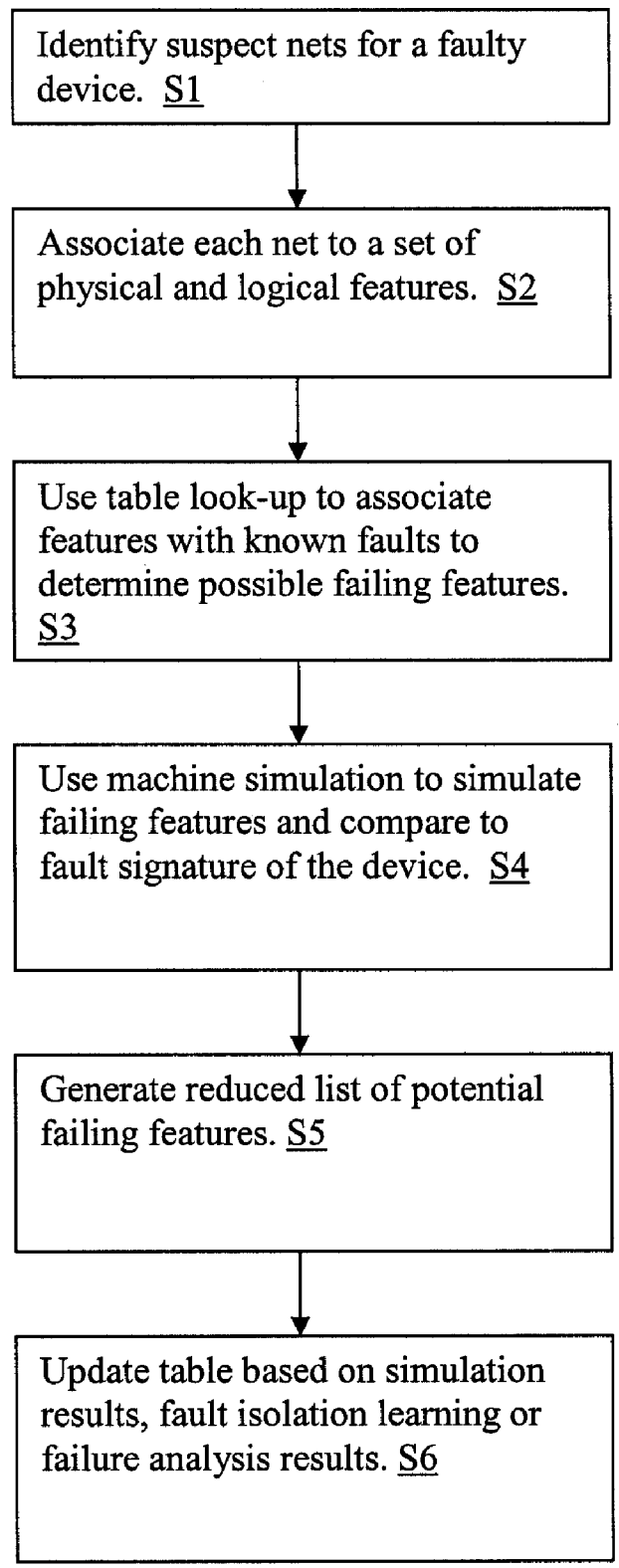
FIG. 2 depicts a flow diagram of a method of implementing an exemplary embodiment of the invention.

Referring now to FIG. 2, a flow diagram of a further exemplary embodiment of a method of the present invention is shown. At step S1, a set of suspect nets for a faulty device is identified. At step S2, each suspect net is associated with some type of physical or logical feature. At step S3, a table look-up is used to associate features with known faults to determine possible failing features. At step S4, if necessary, machine simulation is used to simulate failing features (identified from step S3) and compare to the fault signature of the faulty device. Next, a reduced list of potential failing features is determined at step S5. Finally, at step S6, the look-up table is updated based on any of the simulation results, fault isolation learning, or failure analysis results.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For instance, although the above embodiments describe a defect table 20 that associates features known to cause failures, the defect table could track features known to not cause failures.

The invention claimed is:

1. A diagnosis system for diagnosing a failure in an electronic device, comprising:
    a computing device having a combination of hardware and software comprising: a defect table that associates previously studied features with known failures; and
    a fault isolation system that cross-references an inputted set of suspected faulty device features with the previously studied features listed in the defect table to generate a set of possible failures, and then compares the set of possible failures with a fault signature of an existing failure in order to identify causes of the existing failure, wherein the inputted set of suspected faulty device features is generated from a simulation program that programmatically simulates operation of the electronic device in a virtual environment.

2. The diagnosis system of claim 1, wherein the previously studied features are selected from the group consisting of: net names, instance names, cell names, physical attributes, logical attributes, presence of a feature, and absence of a feature.

3. The diagnosis system of claim 1, wherein the previously studied features comprise physical attributes of the device.

4. The diagnosis system of claim 1, wherein the previously studied features comprise logical attributes of the device.

5. The diagnosis system of claim 1, wherein the simulation program utilizes device logic and operational logs to identify faulty device features.

6. The diagnosis system of claim 5, wherein the inputted set of suspected faulty device features comprises a list of net names.

7. The diagnosis system of claim 1, further comprising a table update system for maintaining and updating the defect table.

8. The diagnosis system of claim 1, further comprising a simulation program for simulating the operation of the device.

9. A method for diagnosing a failure in an electronic device, comprising:
   simulating the operation of the device using a simulation program on a computing device;
   determining a set of features in the device from the simulation that are potentially causing the failure;
   providing a defect table that associates previously studied features with known failures;
   comparing the set of features with the previously studied features listed in the defect table to generate a set of possible failures; and
   comparing the set of possible failures with a fault signature of the failure in order to identify a cause of the failure.

10. The method of claim 9, comprising the further step of performing a failure analysis on the identified cause of the failure.

11. The method of claim 10, wherein the failure analysis comprises a physical analysis.

12. The method of claim 10, wherein the failure analysis comprises a simulation that analyzes a fault signature.

13. The method of claim 9, wherein the set of features and previously studied features comprise net names.

14. The method of claim 9, comprising the further step of updating the defect table with analysis results.

15. A program product stored on a recordable medium for diagnosing a failure in an electronic device, comprising:
   program code for storing data that associates previously studied features with known failures; and
   program code for comparing an inputted set of suspected faulty device features with the previously studied features to generate a set of possible failures, and then for comparing the set of possible failures with a fault signature of an existing failure in order to identify causes of the existing failure, wherein the inputted set of suspected faulty device features is generated from a simulation program that programmatically simulates operation of the electronic device.

16. The program product of claim 15, further comprising means for updating the storing means.

17. The program product of claim 15, wherein the previously studied features and the inputted set of potentially faulty device features are selected from the group consisting of: net names, instance names, cell names, physical attributes, logical attributes, presence of a feature, and absence of a feature.

* * * * *